Nov 1, 1949.  G. L. WILKS  2,486,623
TANNING MACHINE
Filed Dec. 19, 1946  9 Sheets-Sheet 1

Fig.1.

INVENTOR
BY GEOFFREY L. WILKS
ATTORNEY

Nov 1, 1949. G. L. WILKS 2,486,623
TANNING MACHINE
Filed Dec. 19, 1946 9 Sheets-Sheet 3

INVENTOR
BY GEOFFREY L. WILKS
ATTORNEY

Nov 1, 1949.    G. L. WILKS    2,486,623
TANNING MACHINE

Filed Dec. 19, 1946    9 Sheets-Sheet 4

INVENTOR
BY GEOFFREY L. WILKS
ATTORNEY

Nov 1, 1949.  G. L. WILKS  2,486,623
TANNING MACHINE
Filed Dec. 19, 1946  9 Sheets-Sheet 5

INVENTOR
BY GEOFFREY L. WILKS
ATTORNEY

Nov 1, 1949.  G. L. WILKS  2,486,623
TANNING MACHINE
Filed Dec. 19, 1946  9 Sheets-Sheet 8

INVENTOR
BY GEOFFREY L. WILKS
ATTORNEY

Nov 1, 1949.    G. L. WILKS    2,486,623
TANNING MACHINE
Filed Dec. 19, 1946    9 Sheets—Sheet 9

INVENTOR
BY GEOFFREY L. WILKS
ATTORNEY

Patented Nov. 1, 1949

2,486,623

UNITED STATES PATENT OFFICE 2,486,623

TANNING MACHINE

Geoffrey Lovell Wilks, Esher, England

Application December 19, 1946, Serial No. 717,221
In Great Britain October 18, 1945

13 Claims. (Cl. 69—32)

It has for many years been the usual practice in the tanning of leather to immerse the hides successively in a series of pits containing the tanning liquor, the liquor being of progressively increasing strength, the tanning process in some cases extending over a year.

Although this well-known and tried process resulted in the production of first-class leather, it nevertheless had the disadvantage of being a comparatively lengthy process, and consequently machines have been proposed for accelerating the tanning operation.

The chief object of the present invention is to evolve a tanning machine which will result in complete and even impregnation through the section of the hides with the tanning liquor, and with which the speed of the actual tanning process will be materially increased without in any way resulting in marking or disfigurement of the hides as a result of employing a machine in substitution for the process hitherto used over a long period. Further this invention completely eliminates all labour during the time the goods are in process of tanning, hot pitting or bleaching. It merely being necessary to change the liquors.

The process of loading the machine straight from the rounding table or deliming process only entails placing the poles to which the leather is attached in an orthodox form of pit by unskilled labour. Unloading is equally simple.

It will be appreciated that the mechanical treatment to which the hides are subjected must not be so harsh as to cause undue flexure or creasing of the hides, and consequently the designing of a machine which will result in complete tanning throughout the full thickness without damaging the hides in any way has presented a problem which has been satisfactorily solved with the machine forming the subject of the present application.

A method of expediting the tanning of leather in accordance with the present invention consists in drawing the hides through the pit containing the tanning liquor and at the same time progressively flexing each hide throughout its length and in opposite directions.

The machine for carrying out this method includes a roller or equivalent member and means for drawing the hides one by one over the surface of said roller to flex each hide progressively throughout its length whilst being at the same time subjected to the action of the tanning liquor.

Although it is within the scope of the present invention to flex each hide in opposite directions progressively throughout its length during one complete passage through the tanning liquor, it is preferred that each hide shall be progressively flexed in one direction throughout its length during one passage, the action being reversed to progressively flex the hide throughout its length in the opposite direction during a subsequent passage. Furthermore, it is preferred to employ a roller over which each hide is drawn, the radius of the roller affecting the degree at which the hide is flexed or bent, a diameter being selected which will result in the desired degree of flexure without risk of damaging the grain. The degree of flexure may be increased by providing boards at each end of the pit at, for example, 45°, which will start all the butts off from either end at 45° or less in relation to the roller. In this connection it will be appreciated that during the first passage of the hides through the tanning liquor the roller will contact the one surface of the hide, and during the second passage of the hide through the tanning liquor will contact the opposite surface. It will be appreciated that by passing each hide over a roller of the appropriate diameter the surface of the hide engaging the roller will be agitated, squeezed and compressed, whereas the opposite surface will be extended or tensioned, the pores of the hide being thus closed on the side subjected to compression and opened on the side subjected to tension. Consequently, by reversing the process the liquor which has been absorbed into the one surface of the hide and which is subjected to compression will be expelled as a result of closing of the pores on that side, whereas liquor will be drawn into the open pores on the other side; reversal of the process taking place when the hide is passed through the pit for the second time.

In order that the invention may be clearly understood and readily carried into effect the invention is hereinafter described with reference to the accompanying drawings in which.

Figure 1:
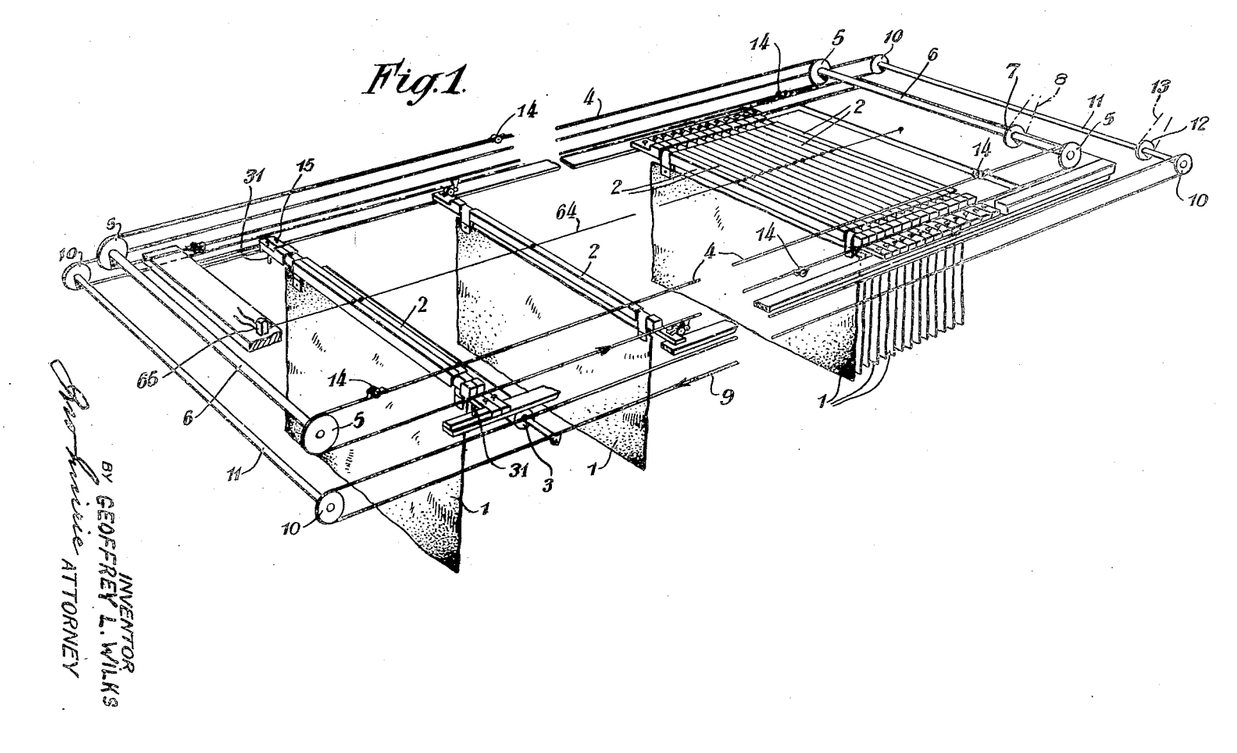
Figure 1 is a perspective view illustrating diagrammatically one form of apparatus in accordance with the present invention.
Figures 2, 3:
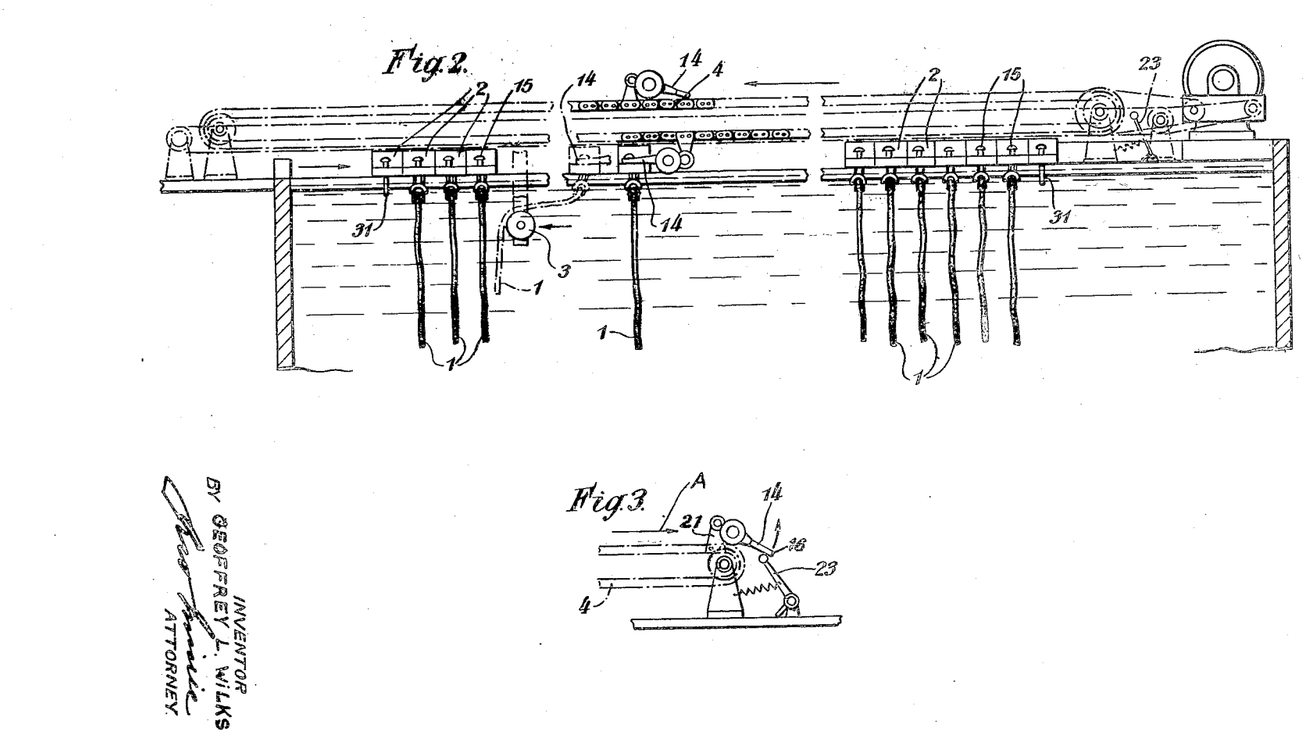
Figure 2 is a side elevation of the apparatus partly in section.
Figure 3 illustrates a constructional detail.

Referring in the first case to Figures 1 to 17 which illustrate one form of apparatus in accordance with the present invention and which is now diagrammatically illustrated in Figures 1 and 2, the hides 1 are suspended from a series of poles 2 which extend across the width of the pit so that the hides are totally immersed in tanning liquor contained therein, the position of the apparatus with respect to the pit being more clearly shown in Figure 2.

The poles are arranged touching each other at one end of the pit and the apparatus in accordance with the invention is designed to transfer the poles and their associated hides in succession from the one end of the pit to the other during which time each hide is progressively flexed throughout its length in one direction, the process being reversed at the opposite end of the pit, the poles being successively transferred back to the starting point with a consequential flexure of the hides in the opposite direction. As shown in Figures 1 and 2, each of the poles is provided with means for gripping and suspending a hide except the two endmost poles which are not adapted to carry hides but are provided only with downwardly projecting pins 31.

With this object in view a roller 3 is provided which is arranged transversely of the pit and in Figure 2 one of the intermediate hides is shown diagrammatically in the process of being flexed by engagement of the hide therewith, the hide being drawn over the roller so as to progressively flex the hide downwardly throughout its length.

Although the diameter of the roller will to a certain extent determine the angle of flexure of each hide, the hides when first inserted in the tanning liquor are comparatively soft and the bending or flexing of each hide over the roller does not produce an excessive load and the roller can be located in fairly close proximity to the hide which succeeds the hide being flexed or bent, the hide which is being flexed thus contacting the next adjacent hide which has the effect of ensuring complete bending or flexure of the hide as it passes over the roller.

As the processing of the goods continues, provision is made to progressively increase the distance between the roller and the butt or hide to be flexed or bent.

For the purpose of transferring the poles from one end of the pit to the other, one by one, endless chains 4 are provided, arranged on opposite sides of the pit, which chains pass over sprocket wheels 5 at opposite ends, the sprocket wheels being mounted on transversely arranged shafts 6, one of which is fitted with a sprocket wheel 7 having a chain or other connection 8 with a suitable source of power for the purpose of traversing the chains at a uniform rate throughout the length of the pit. Further chains 9 passing over sprocket wheels 10 carried by traverse shafts 11 are provided traversing the roller lengthwise of the pit which sprocket wheels 10 are adapted to be driven by a further sprocket wheel 12 and also associated chain 13 from the same or a further source of power supply.

In order to transfer all the poles one by one to the opposite end of the pit the chains 4 are fitted with a number of spaced pick-up devices 14 which are more clearly illustrated in Figures 4 to 9, the pick-up devices being capable of automatic reversal when the direction of travel of the chains 4 is reversed to bring about a reversal in the direction of travel of the poles and their associated hides, the method of reversing the pick-up devices being clearly shown in Figure 3.

In Figure 1 the last hide to be flexed is shown in contact with the roller 3 and in Figure 2 is shown a hide in the process of moving towards the roller, the dotted line position of the hide illustrating clearly the manner in which the hide is flexed progressively downwards as a result of being drawn slowly over the roller whilst fully immersed in the tanning liquor.

The transversely arranged poles 2 may comprise heavy wooden members which are supported at their ends on the edges of the pit or on suitable guide members, the poles being fitted with upstanding pins 15 which are engaged by the pick-up devices 14 carried by two endless chains 4.

Figure 4:
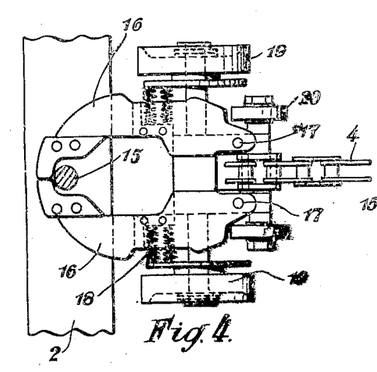
Figures 4 and 5 are plan views of one of the pole pick-up devices and illustrate their method of operation.
Figure 5:
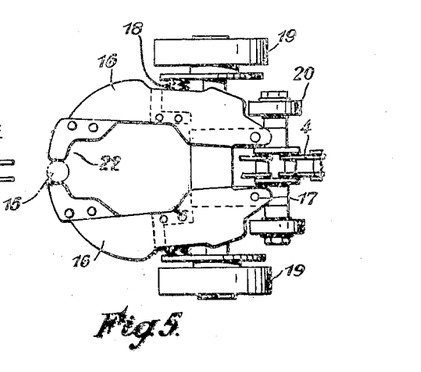
Figures 6, 7:
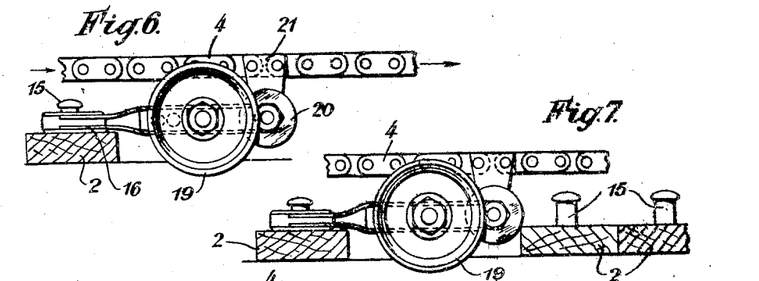
Figures 6 to 9 illustrate a pole pick-up device in side elevation in various positions in the process of conveying and releasing a pole.
Figures 8, 9:
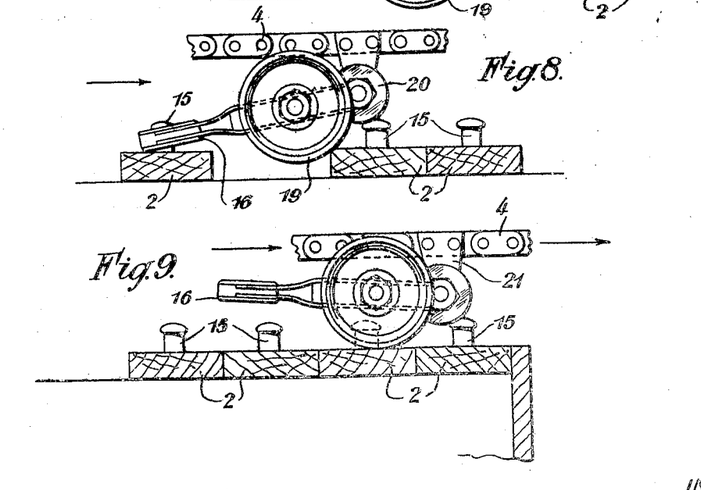
Figure 10:
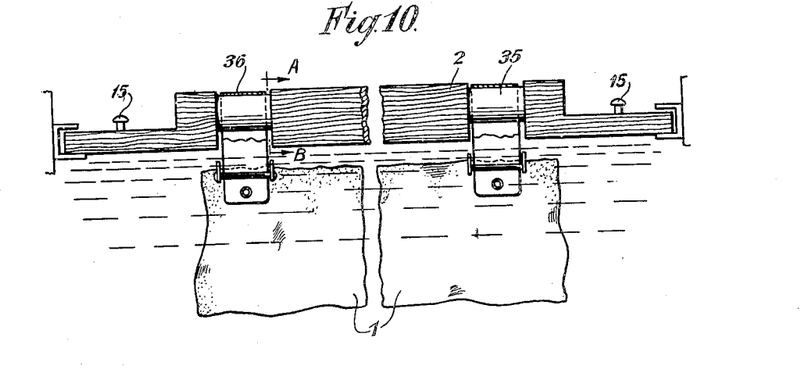
Figure 10 is a transverse section through the pit illustrating one method of attaching the hides to the poles.
Figure 11:
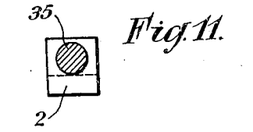
Figure 11 is a section on the line A—B in Figure 10.

As is clearly shown in Figures 4 to 9 each pick-up device includes two co-operating jaw members 16 pivotally mounted at 17 and urged inwardly into engagement with the pins 15 by coil springs 18, each pick-up device being mounted on wheels or rollers 19 and carrying further wheels or rollers 20 of smaller diameter, the pick-up device being suspended from the chain by downwardly depending brackets 21. The jaws 16 are curved or otherwise shaped at 22 to result in the automatic release of their engagement with a pin 15 under increased resistance, the manner of release being shown clearly in Figures 5 to 9. In Figure 4 the jaws are shown in engagement with a pin and in Figure 6 one of the poles 2 is being dragged along the length of the pit by the engagement of the jaws 16 with one of the pins, the direction of travel of the chain and the poles being indicated by arrows. In Figure 7 the pole has been dragged to the opposite end of the pit and it will be seen that the small diameter rollers 20 have contacted the last preceding pole. In Figure 8 the rollers 20 have mounted the last preceding pole and the large diameter rollers 19 are also in process of mounting that pole, at the same time dragging the succeeding pole to its terminal position in which the poles impact. In Figure 9 the pole which has been in the process of being dragged lengthwise of the pit has been brought to an abrupt stop as a result of impact with the preceding pole and this impact has resulted in opening movement of the jaws 16 to release the pin, thereby leaving the pole in its terminal position.

The jaws are so shaped that they will fall onto the pins which they are about to engage under the action of gravity immediately the large diameter rollers 19 have passed over the edge of the pole which is to be picked up. In Figure 6 the jaws have just moved into engagement with the pins and it will be seen that the large diameter rollers 19 have just dropped after passing over the edge of the pole, thus resulting in the jaws making operative engagement with the pins.

For the purpose of reversing the positions of the pick-up devices when the direction of travel of the poles is to be reversed, that is to say, when all the poles have been moved to the opposite end of the pit, two spring urged pawls 23 are provided (see particularly Figure 3) on opposite sides of the pit and in the path of the jaws of the pick-up devices. The action of these spring urged pawls is shown in Figure 3, the direction of travel of the pick-up devices being indicated by the arrow A. The jaws 16 have just engaged the upwardly projecting end of the pawl 23, thus causing angular movement of the pick-up devices about their points of connection with the brackets 21, thereby bringing about a complete reversal of each pickup device as it contacts the pawl 23. A similar but oppositely arranged pair of pawls 23 are arranged at the opposite end of the pit, the pawls being so pivotally mounted that they are operative only in one direction of travel of the pick-up devices the springs associated with the pawls permitting of pivotal movement of the pawls in one direction only, thus permitting the pick-up devices to pass the pawls situated at one end of the pit when their direction of travel is opposite to that shown in Figure 3. It will be appreciated that to effect reversal of movement of the poles it will be necessary to reverse the direction of rotation of sprockets 5 and their associated chains.

Figure 15:
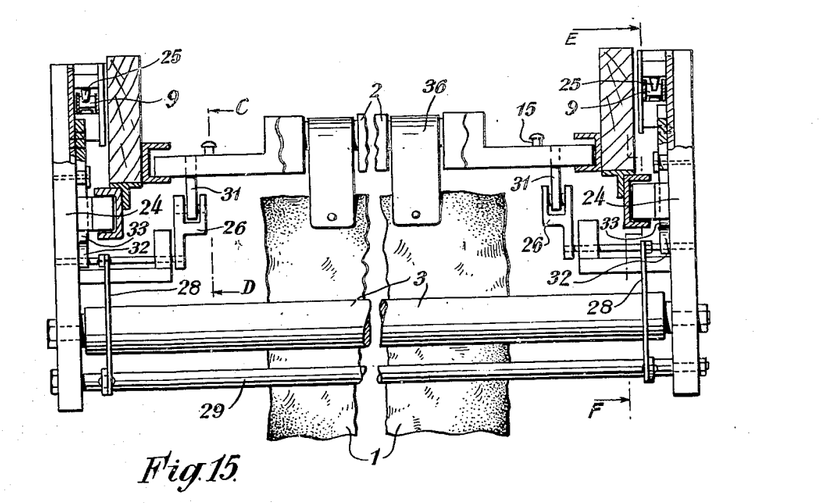
Figure 15 is a transverse section through the pit illustrating one method of moving the hide engaging roller to the opposite end of the pit.
Figure 16:
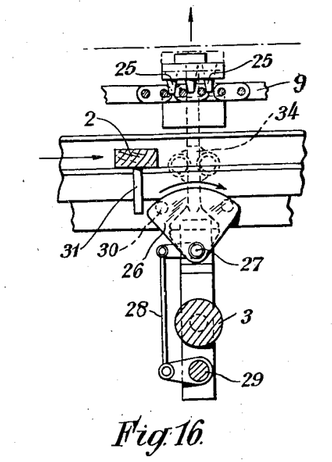
Figures 16 and 17 are sectional views on the lines C—D and E—F in Figure 15.
Figure 17:
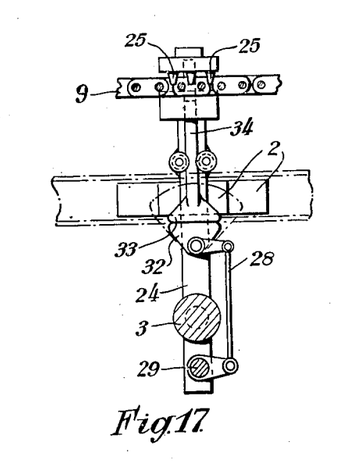

It is desirable from the point of view of ensuring bending or flexure of each hide over the roller 3 that the latter shall be constantly located at a correct distance for the next hide or butt to be flexed. The roller is therefore moved in the opposite direction to the poles by means of chains which are driven at the correct speed to ensure that the roller keeps pace against the poles being removed. It is necessary, therefore, that when all the hides have been flexed in the one direction and have been transferred to the opposite end of the pit that the roller should be given a quick follow-up movement so that it takes up a position in correct proximity to the hides which are already waiting for re-transfer to that end of the pit from which they originated. One method of imparting this quick follow-up movement to the roller is illustrated in Figures 15 to 17. The roller 3 is mounted between two depending side members 24 which members at their upper ends carry toothed dog-clutch members 25 which enter the spaces separating the links of the lower run of the chain 9, the roller being thereby indirectly connected with the chain and moving with the latter. To cause disengagement of the dogclutches 25 with their associated chain links, two sector shaped plates 26 are provided pivotally connected at 27 with the frame members and also connected transversely of the pit by lever and link connections 28, the lowermost levers being rigidly associated with a transverse rod 29. The sector shape plates are fitted with inwardly directed studs 30 which lie in the path of movement of downwardly depending pins 31 on the endmost poles which it will be recollected were free, that is to say, they did not carry the hide or hides. The positions of the pins 31 may be altered to vary the position of the roller relative to the butt or hide to be flexed or bent. Each sector shaped plate 26 has a cam member 32 rigidly associated with it which cam member engages a further cam 33 which is provided with an upwardly projecting shaft extension 34 carrying the downwardly depending teeth of the dogclutch 25. The arrangement is such that in the position shown in Figures 16 and 17 the two flat faces of the cam members 32 and 33 contact, thus permitting the teeth of the dog-clutch members to engage the chain. On, however, the pin of the endmost pole coming into engagement with the studs 30 on the sector shaped plates 26, the plates 26 will be rocked about their pivotal points 27, thus imparting consequential rocking movement to the cams 32. The arrangement is such that the cam members 33 will be moved uniformly in an upward direction to bring about disengagement of the dog-clutch teeth with the chain 9, thus permitting the endmost pole during its travel to carry along the roller to its correct position each time the machine automatically reverses.

The roller operating endmost pole having placed the roller in the correct position, on reversal of the machine remains in position against the first pole carrying a hide or butt until the first claw pick up travels down having been reversed. Immediately the roller operating pole is removed by the first reversed claw the dogs again engage and roller movement proceeds in pace against the poles carrying the hides or butts. For most economic operation the tank is completely filled along its length with hides except for an operating space or gap whose length along the tank is slightly greater than the length of a hide. The roller 3 is moved slowly and steadily in the opposite direction to the movement of the hides at such a rate that it advances the distance between an adjacent pair of hides during the complete bending operation on one hide, that is to say, while the hide carrying chain moves the distance of the operating space. Thus the hide carrying chain 4 moves at a much greater speed than the roller carrying chain 9 and in the opposite direction. The reversal of motion may be effected by a switch which reverses the electric driving motor and, preferably, may be controlled by an operator whose duty it is to supervise the general working of the machine. Alternatively, the reversal switch could be operated automatically when the roller is moved to its new operating position by the hide carrying chain at the end of the run in one direction.

Figures 12, 13, 14:
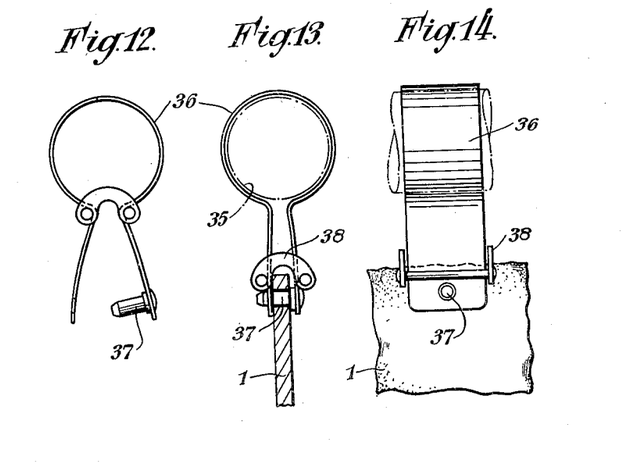
Figures 12 to 14 illustrate one of the hide and pole engaging clips shown in Figure 10.

One method of suspending the hides from their associated poles is illustrated in Figures 10 to 14. In this arrangement each pole is formed with two intermediate portions 35 of circular cross sectional shape on which are mounted clips 36 composed of steel or other suitable resilient metal, one arm of each clip carrying a stud 37 which is adapted to be inserted through a hole punched in the hide, the extremity of the stud passing through a hole formed in the opposite arm of the clip. In Figure 12 the clip is shown in its open position and in Figures 13 and 14 the clip has been closed into engagement with the hide and a sliding clasp member 38 has been drawn downwardly to maintain the clip closed and in operative engagement with the hide. The circular parts 35 permit of the necessary freedom of angular movement of the clips and their associated hides relative to the pole during the flexing of the hide progressively throughout its length.

Figure 18:
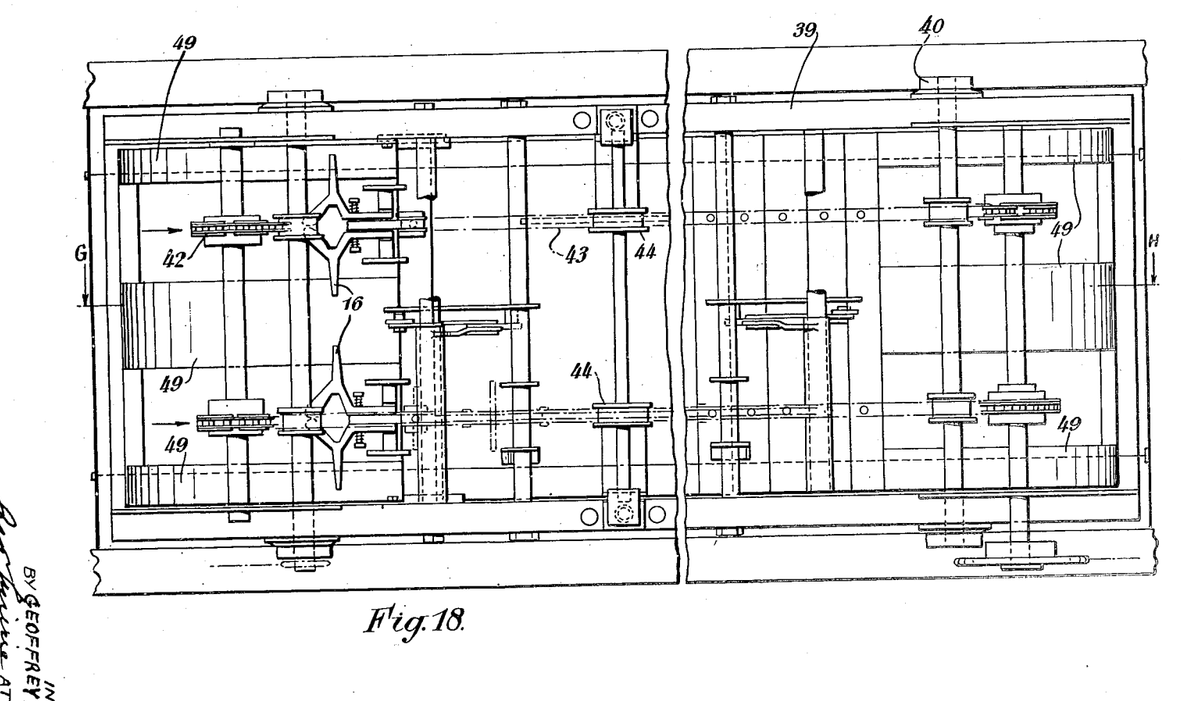
Figure 18 is a plan view illustrating a modified construction of apparatus.
Figure 19:
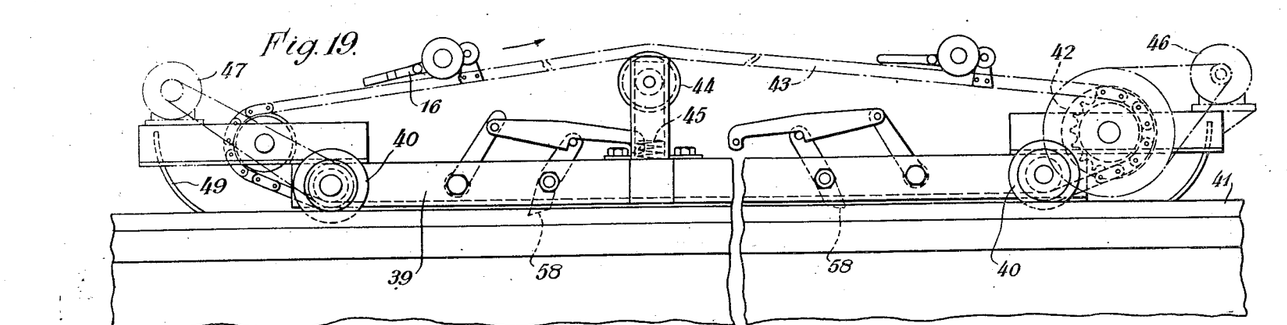
Figure 19 is a side elevation of the construction shown in Figure 18.
Figure 20:
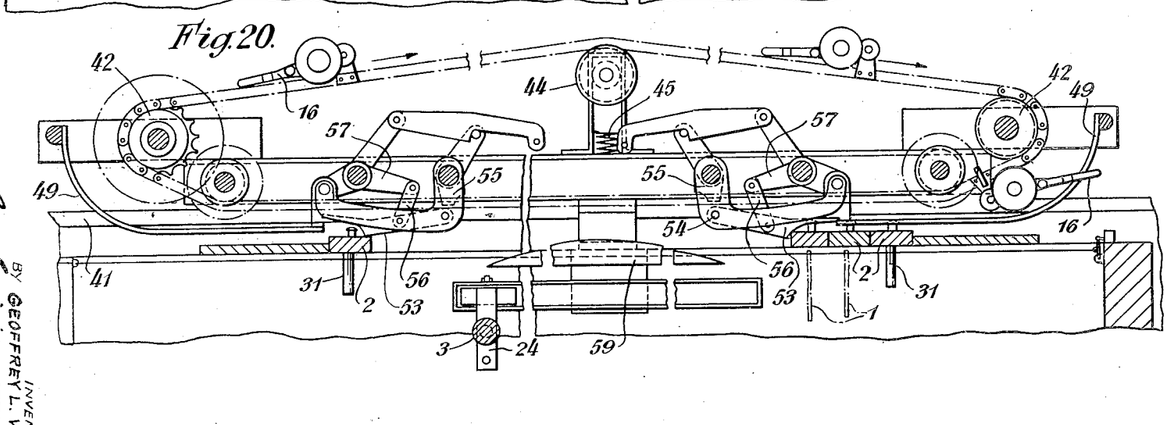
Figure 20 is a longitudinal sectional view on the line G—H of Figure 18.
Figure 21:
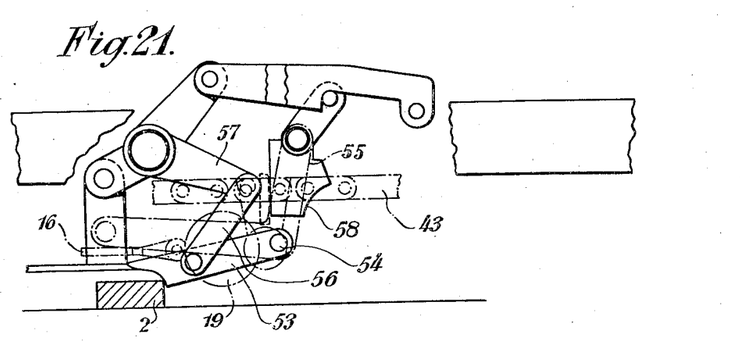
Figure 21 illustrates a constructional detail of the apparatus shown in Figures 18 to 20.

Referring now to Figures 18 to 26 which illustrate a modified form of apparatus in accordance with the invention, the machine in this case takes the form of a carriage which is capable of being traversed lengthwise of the pit, whilst the hides are being drawn through the tanning liquor and subjected to the flexing process. Such a construction has advantages in the case of a comparatively long pit where it might be undesirable to employ a comparatively long run of chain. Figures 18 to 20 show the general shape and construction of the carriage the later comprising side frame members 39 on which are mounted flanged wheels 40 running on rails 41 along opposite edges of the pit. It is preferred that the flanged wheels shall be driven by means of a suitable source of power to traverse the carriage bodily lengthwise of the pit and reverse the direction of movement after it has reached the opposite end. Pairs of sprockets 42 are arranged at opposite ends of the carriage around which pass endless chains 43 which pass over idler pulleys 44 which are urged upwardly by springs 45 to maintain the two chains at the desired tension, one pair of sprocket wheels at one end of the carriage being driven by means of an electric motor 46 or other source of power. In the arrangement shown in Figure 19 the carriage is also fitted with an electric motor 47 at its opposite end for the purpose of driving one pair of the flanged wheels 40.

Figure 24:
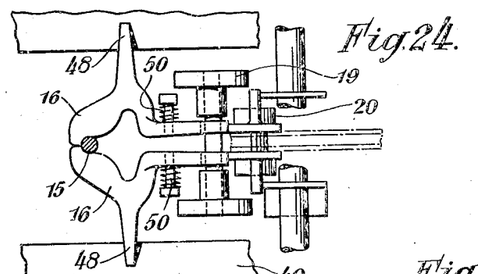
Figure 24 is a plan view of a modified form of pole pick-up device.

The chains are fitted with pick-up devices which may be of the general shape illustrated in Figures 4 to 9, but which preferably take the form shown in Figure 24, the jaws 16 of the pick-up devices being provided with oppositely arranged outwardly directed arms 48 which contact guide members 49 of arcuate shape arranged at opposite ends of the carriage. The guide members 49 serve to guide the pick-up devices into operative engagement with the upstanding pins 15 on the poles, the pick-up devices being fitted with rollers 19 and 20 which engage the poles as in the manner hereinbefore described. The jaws of the pick-up devices are normally held closed by means of coil springs 50 but in the modified form of pick-up shown in Figure 25 the jaws are held closed positively by means of an inverted channel shaped locking member 51 having depending limbs 52 which enter slots formed in the jaw arms 48, the locking member being suspended from the chain so that the locking member will be moved automatically out of operative engagement with the pick-up device when the latter is in a position to release the pole which it has dragged to the opposite end of the pit, thus permitting the jaws to open to release the pin on the pole.

For the purpose of ensuring the release of each pole at the termination of its travel and prevent undesirable endwise movement of the carriage in the opposite direction due to the sudden increase in drag resulting from picking up a pole, the carriage is fitted with two pivoted stop members 53 pivotally mounted at 54 to members 55 and adapted to be lifted out of operative engagement with the poles by links 56 and levers 57 which in turn are moved as a result of engagement of the pick-up devices with pivotally mounted depending trip levers 58. In this way immediately a pole starts to move as a result of its connection with the pick-up devices, the appropriate stops 53 will be lifted to permit continued movement of the pole, the stop members automatically resuming their operative positions on the pole passing the stop members. The arrangement of the various parts is illustrated in detail in Figure 21, the stop member 53 being shown in contact with a pole 15 and a pick-up device 16 indicated by dotted lines about to engage the trip lever 58 to lift the stop member out of operative engagement with the pole.

Figure 22:
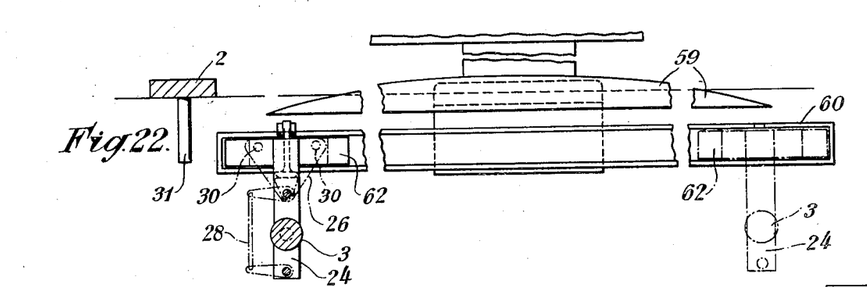
Figure 22 illustrates in side elevational a further constructional detail.
Figure 23:
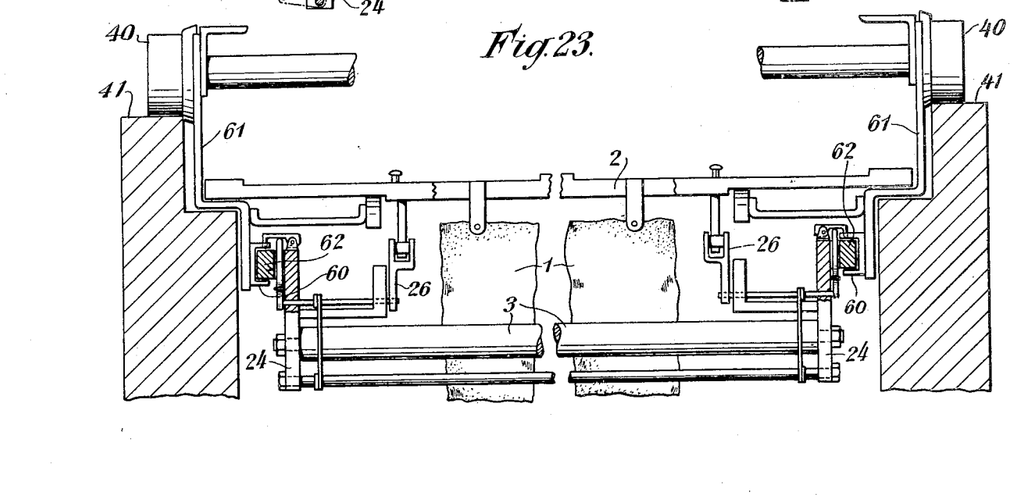
Figure 23 is a transverse section through the pit illustrating a method of returning the roller to the opposite end of the carriage shown in Figures 18 and 20.

Referring now particularly to Figures 22 and 23 which illustrate ramps 59 arranged on opposite sides of the pit, such ramps are necessary when employing a sliding carriage to permit the poles to pass over the supports for the rollers. In this arrangement traversing movement of the roller is limited by the length of channel shaped guides 60 which are supported from side members of the carriage by brackets 61, the roller 3 being mounted between depending arms 24 which are carried by bearing blocks 62 running in the channel shaped guides 60. The remaining parts of the roller mechanism correspond with the arrangement shown in Figures 15 to 17, movement of the roller lengthwise of the channel shaped guides resulting from engagement of depending pins 31 on the endmost pole contacting studs 30 on arcuate shaped plates 26 and the resulting disengagement of dog-clutches from holes formed in the channels. The arrangement is such that the ramps permit movement of the poles over the roller mechanism, the pins 31 on the endmost poles being sufficiently long to maintain engagement with the studs 30.

Figures 25, 26, 27:
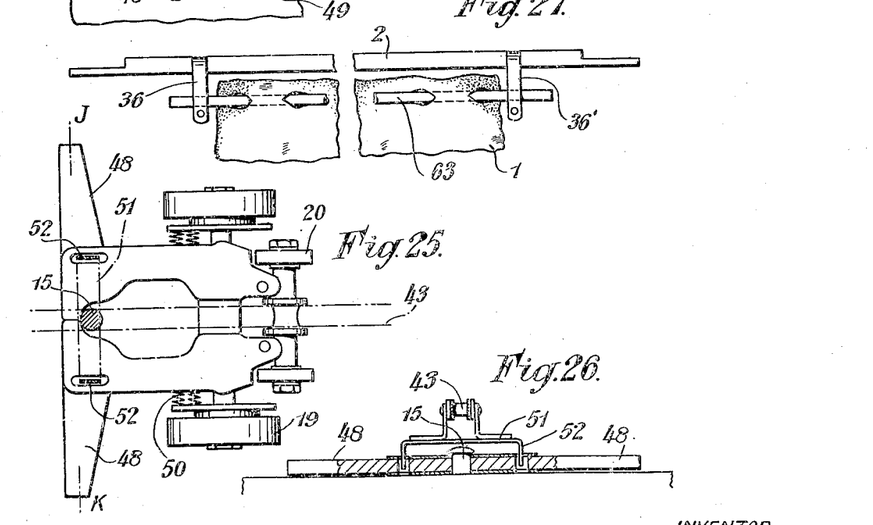
Figure 25 is a plan view illustrating a further modified construction.
Figure 26 is a transverse section on the line J—K in Figure 25.
Figure 27 illustrates an alternative method of supporting the hides on the poles.

Figure 27 illustrates a modified method of suspending the hides from the poles. In this arrangement a rod 63 is threaded through holes punched in the hide and is supported by clips 36' which may be somewhat similar in construction to those shown in Figures 10 to 14.

The electric motors employed to drive the sprocket chains and the carriage are for example of the squirrel-cage type, reversal of the direction of movement of the chains and carriage being effected by means of limit switches operating a solenoid reversing switch controlling the direction of rotation of the motors. Operation of the limit switches may be brought about as a result of engagement of a toggle on the chain or a part of the carriage on the toggle or carriage reaching the end of its run when the last pole has been transferred to the opposite end of the pit. In order to stop the machine instantaneously in the event of a pole becoming displaced the poles may have eyeletted connections with a cable or wire 64 running lengthwise of the pit (see Figure 1) which when pulled operates a switch 65 to break the electrical circuit and thus stop the machine.

It will be appreciated that as a result of reversal in operation of the machine the hides will be flexed over the roller in the opposite direction, and this initial and second flexing of the hides results in the expulsion of liquor from the hides, into which the tannic acid has been absorbed, and allows new liquor to be absorbed into the hides, thus greatly speeding up the process of tanning without in any way damaging the fibres of the hides as a result of the mechanical treatment to which they are subjected.

Although only one chain is referred to in some instances in the foregoing description, it will be appreciated that as the poles may be comparatively long two such chains moving in unison will in most cases be necessarily arranged at each side of the pit, the pick-up mechanism being likewise duplicated so that each pole will be engaged by the pick-up mechanism at both ends.

It will be appreciated from the foregoing description that the machine hereinbefore described is of simple and cheap construction, and that the action of flexing the hides combined with the flow of liquor and surface agitation of the goods in process will result in considerable speeding-up of the tanning process without in any way damaging the fibres of the hides, the machine being suitable for installation in existing tanning pits if so desired.

Furthermore, the work required to load and unload the machine will be reduced to the minimum, and it will be possible to leave the hides in the same pits throughout the whole of the process of tanning by merely changing the strength of the tanning liquor.

What I claim is:

1. An apparatus for tanning leather comprising in combination, a pit for containing tanning liquor, means for suspending the hides individually so that they depend downwardly into the tank for immersion in tanning liquor, means for movably supporting said suspending means for movement longitudinally of said pit to draw each hide individually through the tanning liquor, a contact member positioned transversely within the pit and over which the hide is progressively drawn during its travel longitudinally of the pit, and means for reversibly moving said suspending means longitudinally of the pit to cause the opposite surfaces of the hides to contact said member and to be acted thereon while being successively drawn in opposite directions through the tanning liquor and over said member.

2. A tanning machine as defined in claim 1, including a series of poles supported horizontally across the pit at one end thereof and each adapted to carry one or more depending hides, and means for picking up the poles and their associated hides one by one and conveying them to the opposite end of the pit, thereby drawing the hides through the tanning liquor and progressively flexing them at the same time by drawing them over the member.

3. A tanning machine as defined in claim 2, including means for automatically reversing the direction of the pick-up means after the poles have all been conveyed from one end of the pit to the other.

4. An apparatus for tanning leather comprising in combination, a pit for containing tanning liquor, a plurality of poles supported across the pit for suspending the hides individually so that they depend downwardly into the pit for immersion in tanning liquor, endless chain means carrying spaced pick-up members for automatically picking up individual poles and moving said poles longitudinally of said pit to draw each hide individually through the tanning liquor, said chain means and pick-up members being adapted to convey said poles to the end of the pit and then automatically discard them, a contact member positioned transversely within the pit and over which the hide is progressively drawn to flex it during its travel longitudinally of the pit, and means for reversibly moving said chain means and poles longitudinally of the pit to cause the opposite surfaces of the hides to contact said member and to be flexed thereon while being successively drawn in opposite directions through the tanning liquor and over said member.

5. A tanning machine as defined in claim 4, including means for automatically reversing the position of the pick-up members on the direction of travel of the endless chain means being reversed.

6. A tanning machine as defined in claim 5, wherein each pick-up member includes a pair of spring urged jaws which engage an upstanding pin on the pole and remain in engagement therewith until the pole contacts an abutment at the opposite end of the pit, the impact of the pole with the abutment causing the jaws to open to discard the pin.

7. An apparatus for tanning leather comprising in combination, a pit for containing tanning liquor, means for suspending the hides individually so that they depend downwardly into the pit for immersion in tanning liquor, means for movably supporting said suspending means for movement longitudinally of said pit to draw each hide individually through the tanning liquor, a roller positioned transversely within the pit and over which the hide is progressively drawn to flex it during its travel longitudinally of the pit, means for reversibly moving said suspending means longitudinally of the pit to cause the opposite surfaces of the hides to contact said roller and to be flexed thereon while being successively drawn in opposite directions through the tanning liquor and over said roller, and means for imparting a quick follow-up movement to the roller when the last hide has been flexed to bring the roller into position for flexing the hides in the opposite direction.

8. A tanning machine as defined in claim 7, wherein the follow-up movement is effected by a dummy pole which does not carry a hide, the dummy pole serving to disconnect the roller from its associated slowly moving conveyor chain and move it quickly upon reversing of the machine from the end of the pit to the correct position against the butts to be flexed.

9. A tanning machine as defined in claim 8 wherein the roller is mounted between members which are connected with the chain means by toothed dog-clutch members which are disconnected temporarily from the chain means by downwardly projecting pins on the dummy pole.

10. A tanning machine comprising, in combination, a pit for containing tanning liquor, a plurality of poles for carrying depending hides, a carriage mounted for movement over the pit lengthwise thereof, endless chains carried by said carriage, pick-up members carried by said chains for picking up poles carrying hides and conveying them one by one to the opposite end of the pit, a roller supported by said carriage for movement lengthwise of the carriage, said roller being positioned in the path of movement of the hides carried by said poles, whereby the hides are progressively flexed over said roller.

11. A tanning machine as defined in claim 10 including ramps over which the poles are dragged during movement from one end of the pit to the other to enable the poles to pass over the roller supporting mechanism.

12. A tanning machine as defined in claim 11 including means for preventing reverse of movement of the carriage consequential upon the sudden picking up of a pole by the pick-up devices.

13. An apparatus for tanning leather comprising in combination, a pit for containing tanning liquor, means for suspending the hides individually so that they depend downwardly into the pit for immersion in tanning liquor, said means including hide supporting clips each including a pair of resilient arms, one arm carrying a stud adapted to be passed through a hole punched in the hide and maintained in engagement with a hole in the opposite arm, means for movably supporting said suspending means for movement longitudinally of said pit to draw each hide individually through the tanning liquor, a contact member positioned transversely within the pit and over which the hide is progressively drawn during its travel longitudinally of the pit, and means for reversibly moving said suspending means longitudinally of the pit to cause the opposite surfaces of the hides to contact said member and to be acted thereon while being successively drawn in opposite directions through the tanning liquor and over said member.

GEOFFREY LOVELL WILKS.

REFERENCES CITED

The following references are of record in the file of this patent:

UNITED STATES PATENTS

| Number | Name | Date |
|---|---|---|
| 626,181 | Mario | May 30, 1899 |
| 806,899 | Koenitzer | Dec. 12, 1905 |
| 1,280,544 | Quaedvlieg | Oct. 1, 1918 |
| 1,878,420 | Merritt | Sept. 20, 1932 |